United States Patent [19]
Beighley et al.

[11] 3,906,719
[45] Sept. 23, 1975

[54] ROCKET HAVING MOVABLE SECONDARY NOZZLE

[75] Inventors: Clair M. Beighley, El Dorado County; Orin J. Demuth; Richard W. Froelich, both of Sacramento County, all of Calif.

[73] Assignee: Aerojet-General Corporation, El Monte, Calif.

[22] Filed: Sept. 19, 1968

[21] Appl. No.: 764,369

[52] U.S. Cl. ............... 60/225; 60/245; 60/261; 60/270
[51] Int. Cl. .................................. F02k 9/06
[58] Field of Search ............ 60/224, 225, 244, 245, 60/246, 261, 263, 264, 270; 239/265.17

[56] References Cited
UNITED STATES PATENTS

| | | | |
|---|---|---|---|
| 2,487,588 | 11/1949 | Price | 239/127.3 |
| 2,547,936 | 3/1951 | Grow | 60/258 |
| 2,686,473 | 8/1954 | Vogel | 60/244 |
| 2,883,829 | 4/1959 | Africano | 60/245 |

*Primary Examiner*—Samuel Feinberg
*Attorney, Agent, or Firm*—Edward O. Ansell; Taylor M. Belt; John S. Bell

[57] ABSTRACT

A rocket according to the present disclosure has a primary combustion chamber and a primary nozzle for producing thrust. A secondary chamber and a movable secondary nozzle are provided, and an air inlet provides communication to the secondary chamber. In one position of the nozzle, the secondary nozzle closes the air inlet, and the primary combustion chamber and primary nozzle provide maximum thrust for launch or boost purposes. In a second position of the secondary nozzle, the air inlet is open to admit air into the secondary chamber where it mixes with exhaust gas from the primary combustion chamber and burns any unburned fuel in the exhaust to provide acceleration with minimum fuel expenditure at supersonic velocities. In a third position of the secondary nozzle, the nozzle is moved rearward and the fuel-oxidizer ratio to the primary combustion chamber is adjusted so that the exhaust gas discharged through the primary nozzle contains a high percentage of fuel. The fuel is burned in the secondary chamber with air admitted through the air inlet to sustain supersonic cruising velocities.

9 Claims, 6 Drawing Figures

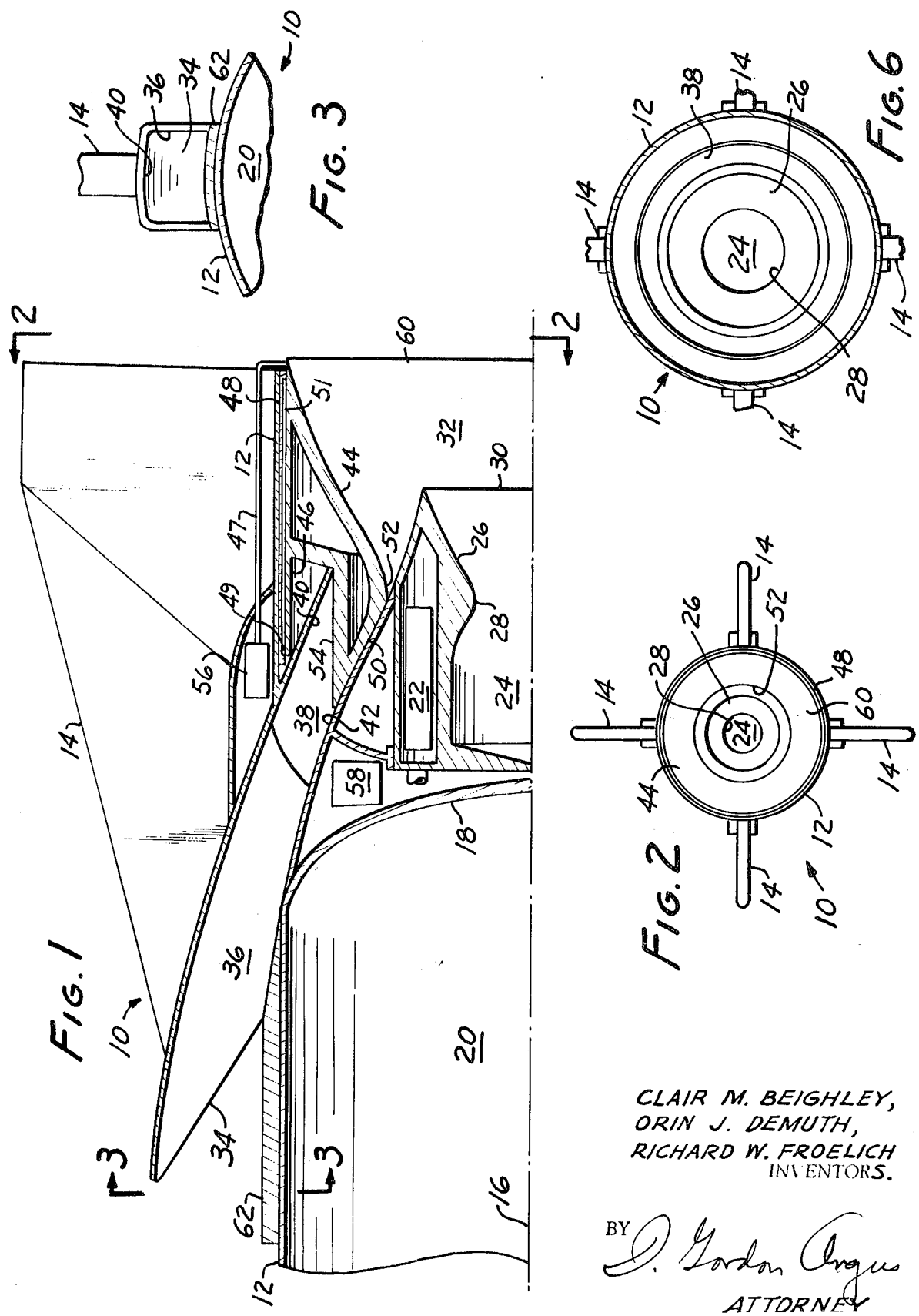

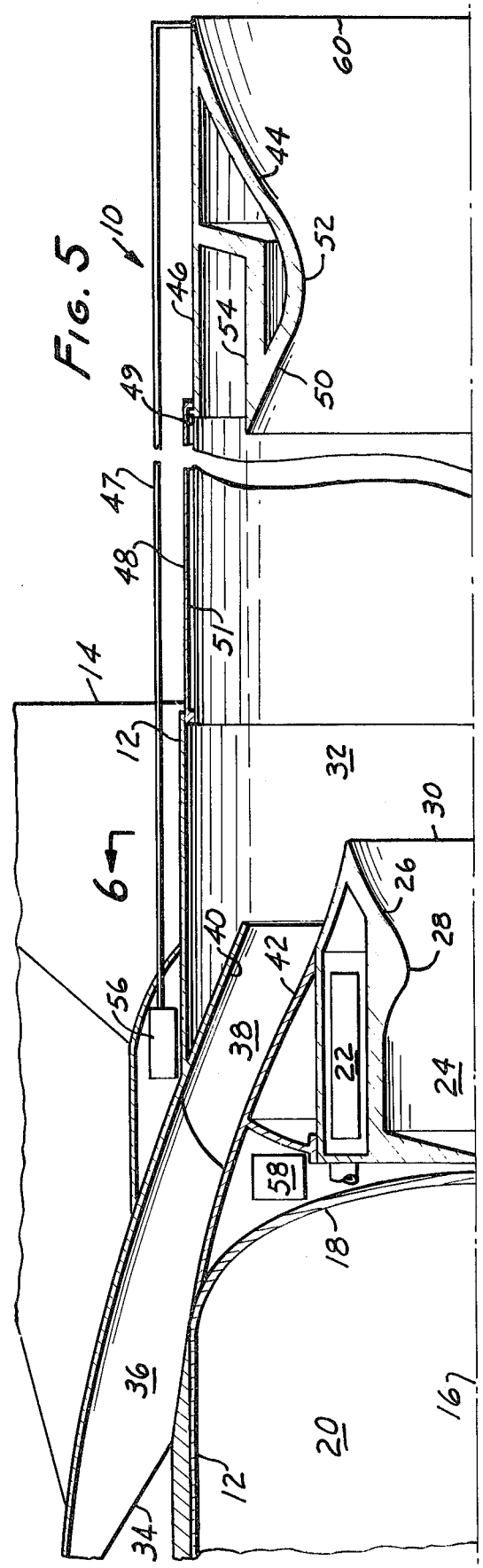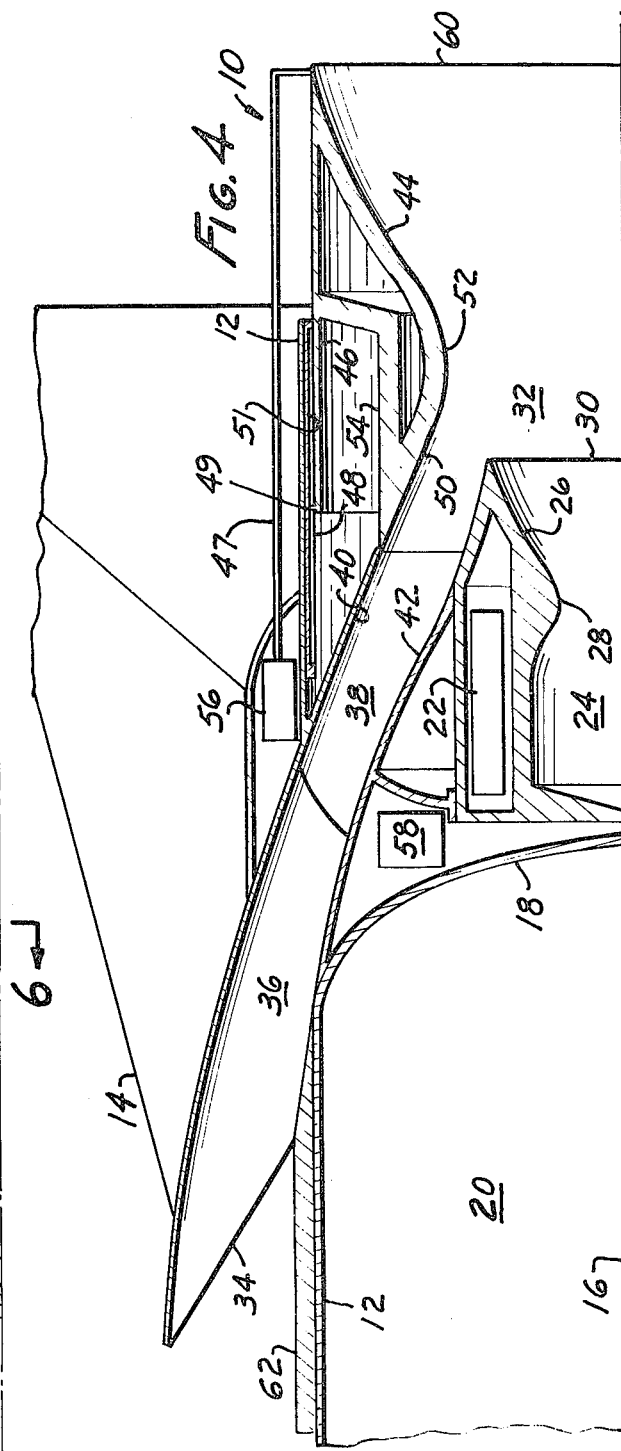

ROCKET HAVING MOVABLE SECONDARY NOZZLE

This invention relates to rockets having secondary nozzles capable of assuming a plurality of axial positions.

It is an object of the present invention to provide a missile having a secondary nozzle capable of being moved between a plurality of axial positions to provide optimum performance during various flight conditions.

A missile according to the present invention includes air inlet means for providing communication between the atmosphere and a chamber within the rocket. A movable secondary nozzle is provided, which nozzle closes the air inlet in one axial position, thereby permitting the rocket engine to obtain maximum thrust during launch or boost operations, and opens the air inlet means in a second axial position, thereby permitting air to enter the secondary chamber so that the rocket engine provides optimum supersonic acceleration conditions.

According to an optional and desirable feature of the present invention, the nozzle is capable of assuming a third axial position to provide a secondary combustion chamber to obtain complete combustion of fuel during supersonic cruising conditions.

According to another feature of the present invention, a sliding seal multi-section shroud is utilized for supporting the secondary nozzle, the shroud being capable of being compacted into the rocket so as to collapse the secondary combustion chamber during missile storage.

Another feature of the present invention resides in the achievement of a more effective specific impulse during boost operation by missiles according to the present invention than by prior missiles, so as to require less propellant for launching purposes than heretofore required, and thereby increasing the range of fixed-volume missiles.

The above and other features of this invention will be more fully understood from the following detailed description and the accompanying drawings, in which:

FIG. 1 is a fragmentary side view elevation, partly in cutaway cross-section, of a missile having a secondary nozzle according to the presently preferred embodiment of the present invention, which nozzle is in a first or launch or boost position;

FIG. 2 is an end view taken at line 2—2 in FIG. 1;

FIG. 3 is a fragmentary section view taken at line 3—3 in FIG. 1;

FIG. 4 is a fragmentary side view elevation, partly in cutaway cross-section, as in FIG. 1, of the missile illustrated in FIG. 1 having its secondary nozzle in a second or supersonic acceleration position;

FIG. 5 is a fragmentary side view elevation, partly in cutaway cross-section, as in FIG. 1, of the missile illustrated in FIG. 1 having its secondary nozzle in a third or cruise position; and FIG. 6 is a section view taken at line 6—6 in FIG. 5.

In the drawings there is illustrated a missile 10 according to the presently preferred embodiment of the present invention. Missile 10 has a substantially cylindrical skin 12 forming a body having an axis 16, and a plurality of stabilizing fins 14. Although four stabilizing fins are illustrated, it is to be understood that any number of stabilizing fins may be used and that four such stabilizing fins are illustrated here only for purposes of illustration. Skin 12, together with wall 18, forms chamber 20 for storing propellant. By way of example, the propellant stored in chamber 20 may be a solid or a liquid propellant and may be stored in suitable fuel and oxidizer tanks (not shown) in chamber 20.

The fuel and oxidizer tanks in chamber 20 are connected by means (not shown) to propellant control valve 22 which in turn controls the amount of propellant injected by means of an injector (not shown) into primary combustion chamber 24. Downstream from combustion chamber 24 is nozzle 26 forming throat 28. Nozzle 26 discharges through outlet 30 into chamber 32.

Chamber 32 is vented to the atmosphere through air inlet conduits 36 having their entrance openings 34 formed in stabilizing fins 14 and opening into conical manifold chamber 38. Manifold 38 is formed by conical surfaces 40 and 42, and plate 62 may be provided at the inlets 34 to aid in guiding air through passages 36.

Secondary nozzle 44 is mounted to cylindrical shroud 46 which in turn is sealed to shroud 48. Shroud 48 is sealed to skin 12. Nozzle 44 includes conical surface 50 upstream from throat 52 and cylindrical surface 54. Conical surface 50 is adapted to abut conical surface 42 forming part of manifold 38 so that cylindrical surface 54 closes off manifold 38 from communication with chamber 32 when the secondary nozzle is in the position illustrated in FIG. 1.

Shroud actuating mechanism 56 is connected to shroud 46 by means of rod 47 and is adapted to be driven by means of power supply 58. Lock pins 49 mounted to shroud 46 and mating with slots 51 in shroud 48 pull shroud 48 out to the position illustrated in FIG. 5 when pins 49 contact the end of slots 51. Mechanism 56 may be operated manually, by radio control from a remote location, or automatically by suitable velocity sensors.

Outlet 60 is formed by nozzle 44 for discharge of exhaust gases from the missile.

In operation of the rocket, secondary nozzle 44 is moved to its most forward axial position as illustrated in FIG. 1. When in the position illustrated in FIG. 1, surface 50 of nozzle 44 abuts surfacae 42 of manifold 38, and surface 54 closes manifold 38 from communication with chamber 32. Propellant in chamber 20 is introduced and burned in primary combustion chamber 24 and is discharged through throat 28 of nozzle 26 to produce a thrust in a manner well-known in the art. Full thrust during launch or boost operation is provided by the operation of nozzle 26 and chamber 24, and chamber 32 is closed to the atmosphere. If desired, during the launch or boost operation, an additional movable shroud (not shown) may be placed in front of inlet opening 34 to reduce drag at the inlet.

When the missile has reached supersonic velocities, actuator 56 is operated to move shroud 46 to the position illustrated in FIG. 4. Secondary nozzle 44 is thereby moved to a position so that the nozzle surface of secondary nozzle 44 extends beyond the nozzle surface of nozzle 26 so as to enlarge or continue the apparent nozzle surface of nozzle 26. The outlet of the rocket is moved rearward along axis 16 as illustrated in FIG. 4. Additionally, surface 54 is moved to a position out of manifold 38 so that air is admitted through inlet opening 34, passages 36, manifold 38 and into chamber 32. The air is mixed with the primary rocket gases and is discharged through nozzle 44 to thereby increase the propulsion system thrust. The missile continues to accelerate under these conditions until a final cruise velocity is reached.

When the cruise velocity is attained, actuator 56 is again operated to move shrouds 46 and 48 and nozzle 44 to the position illustrated in FIG. 5. When in the position illustrated in FIG. 5, chamber 32 forms a secondary combustion chamber. Valve 22 may be operated to reduce the flow of fuel and oxidizer to the primary chamber so that the combustion gases from the primary chamber 24 contain a high percentage of unburned fuel. The unburned fuel is burned in air admitted through the air inlets into the secondary combustion chamber 32 formed between nozzles 26 and 44. The additional combustion in the secondary chamber sustains the missile cruise velocity at a high value of specific impulse.

The present invention thus provides a rocket having a movable secondary nozzle capable of assuming a plurality of positions to provide maximum efficiency at various conditions. The shrouded portion of the missile may be collapsed during missile storage, thereby allowing more missiles to be stored in a given space than heretofore achieved. The secondary nozzle provides more effective specific impulse during boost operation than achieved by prior missiles. The more efficient specific impulse achieved by the missile according to the present invention reduces the amount of propellant required during the boost operation from that required by previous missiles so that a greater amount of propellant is available for cruising, thereby increasing the range of the missile over that of previous missiles.

This invention is not to be limited by the embodiment shown in the drawings or described in the description, which is given by way of example and not of limitation, but only in accordance with the scope of the appended claims.

What is claimed is:

1. A rocket comprising: a body having an axis; a primary rocket motor mounted to said body for producing thrust, said motor having a primary combustion chamber and a primary nozzle with an exhaust opening; a secondary chamber in said body, said secondary chamber being in fluid communication with said primary nozzle; air inlet means to said secondary chamber; and secondary nozzle means in said secondary chamber, said secondary nozzle means having a throat therein and being movable along said axis between a first position wherein said secondary nozzle closes said air inlet means with said throat being upstream of said primary nozzle exhaust opening and a second position wherein said secondary nozzle is downstream from said primary nozzle.

2. Apparatus according to claim 1 wherein said air inlet means comprises a plurality of air inlet openings in said body providing communication to atmosphere surrounding the rocket, and a manifold in fluid communication with said air inlet openings and said secondary chamber.

3. Apparatus according to claim 2 wherein said secondary nozzle means includes a surface adapted to shut off communication between said manifold and said secondary chamber when said secondary nozzle means is in said first position.

4. Apparatus according to claim 1 wherein said secondary nozzle means permits introduction of air through said air inlet means when said secondary nozzle means is in said second position so that air is mixed with exhaust gas from said primary combustion chamber and any unburned gas in the exhaust gas from said primary combustion chamber is burned in said secondary chamber, the gases being thereafter exhausted through said secondary nozzle to thereby provide acceleration to the rocket.

5. Apparatus according to claim 4 wherein said secondary nozzle means is capable of assuming a third position axially downstream from said second position, whereby when said secondary nozzle means is in said third position, the exhaust from said primary combustion chamber can be adjusted to contain a relatively large percentage of fuel so that such fuel may be burned in said secondary chamber to sustain the cruising velocity of the rocket.

6. Apparatus according to claim 5 wherein said secondary nozzle means includes a secondary nozzle mounted to a movable shroud, and actuator means adapted to axially move said shroud.

7. Apparatus according to claim 6 wherein said air inlet means comprises a plurality of air inlet openings in said body providing communication to atmosphere surrounding the rocket, and a manifold in fluid communication with said air inlet openings and said secondary chamber.

8. Apparatus according to claim 7 wherein said secondary nozzle means includes a surface adapted to shut off communication between said manifold and said secondary chamber when said secondary nozzle means is in said first position.

9. Apparatus according to claim 1 wherein said secondary nozzle means includes a secondary nozzle mounted to a movable shroud, and actuator means adapted to axially move said shroud.

* * * * *